United States Patent
Cohen et al.

(10) Patent No.: US 12,073,229 B2
(45) Date of Patent: Aug. 27, 2024

(54) SINGLE NODE DEPLOYMENT OF CONTAINER PLATFORM

(71) Applicant: RED HAT, INC., Raleigh, NC (US)

(72) Inventors: Eran Cohen, Ramat Gan (IL); Rom Freiman, Raanana (IL); Omer Tuchfeld, Berlin (DE); Igal Tsoiref, Rehovot (IL)

(73) Assignee: Red Hat, Inc., Raleigh, NC (US)

( * ) Notice: Subject to any disclaimer, the term of this patent is extended or adjusted under 35 U.S.C. 154(b) by 133 days.

(21) Appl. No.: 17/547,750

(22) Filed: Dec. 10, 2021

(65) Prior Publication Data

US 2023/0185580 A1   Jun. 15, 2023

(51) Int. Cl.
G06F 9/44    (2018.01)
G06F 9/4401  (2018.01)

(52) U.S. Cl.
CPC ................... G06F 9/4416 (2013.01)

(58) Field of Classification Search
None
See application file for complete search history.

(56) References Cited

U.S. PATENT DOCUMENTS

| | | | |
|---|---|---|---|
| 9,280,360 B2 | 3/2016 | Xu et al. | |
| 10,025,587 B2 | 7/2018 | Lu | |
| 2014/0053149 A1 | 2/2014 | Wu et al. | |
| 2019/0042320 A1* | 2/2019 | Prince | G06F 9/5077 |
| 2019/0334909 A1 | 7/2019 | Schmitt | |
| 2023/0012979 A1* | 1/2023 | Vidyadhara | G06F 11/2284 |
| 2023/0118271 A1* | 4/2023 | Punathil | G06F 8/311 |
| | | | 717/120 |

FOREIGN PATENT DOCUMENTS

CN          110493028 A       11/2019

OTHER PUBLICATIONS

"Using Minikube to Create a Cluster" The Linux Foundation, (Nov. 9, 2021), pp. 2.
"Advanced Features" (2020). OpenStack Docs, pp. 7.
Nam, S. et al. (Jun. 28- Jul. 1, 2015). "Fast Bootstrapping Method for the Memory-Disk Integrated Memory System," Department of Computer Science Yonsei University Seoul, Korea, pp. 7.

* cited by examiner

*Primary Examiner* — Fahmida Rahman
(74) *Attorney, Agent, or Firm* — Womble Bond Dickinson (US) LLP

(57) ABSTRACT

A method includes generating a temporary computing environment on a computing node, wherein the temporary computing environment comprises a bootstrapping component, generating, by the bootstrapping component, a configuration for a container platform from within the temporary computing environment, and writing, by the processing device, the configuration to storage of the computing node from within the temporary computing environment.

20 Claims, 6 Drawing Sheets

SINGLE NODE DEPLOYMENT OF CONTAINER PLATFORM

TECHNICAL FIELD

Aspects of the present disclosure relate to edge cluster management, and more particularly, to deploying a container platform to a single computing node.

BACKGROUND

A container orchestration engine (such as the Red Hat™ OpenShift™ Container Platform) may be a platform for developing and running containerized applications and may allow applications to scale as needed. Container orchestration engines may comprise a control plane and one or more worker nodes on which pods may be scheduled. A pod may refer to the most basic (smallest) compute unit that can be defined, deployed, and managed by the control plane (e.g., one or more containers deployed together on a host). A computing node may be bootstrapped (e.g., installed) with a container orchestration system using an initial configuration file such as an ignition config file that describes how to create the container orchestration system.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
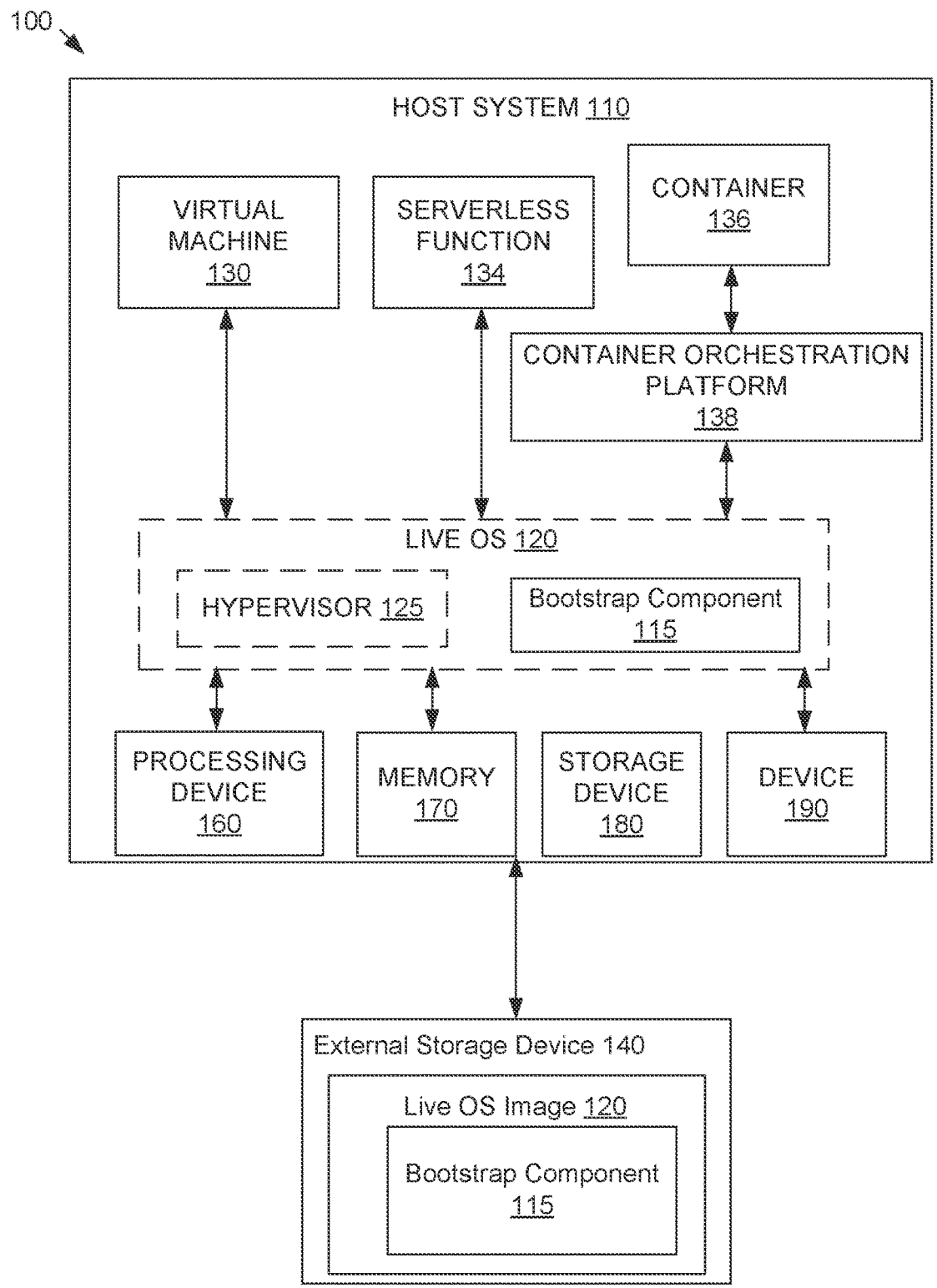
FIG. 1 is a system diagram that illustrates an example system for bootstrapping of a container orchestration system on a single node, in accordance with some embodiments.

Deployment of a container orchestration system, such as Red Hat Openshift™, may include bootstrapping computing nodes, whether a virtual machine or bare metal machine, with the configurations of the cluster. In conventional systems, a cluster for the container orchestration system is created using a separate bootstrap node. An installer loads bootstrapping binaries (e.g., an ignition configuration file) from which the bootstrap node boots. The bootstrap binaries may describe how to create the cluster. The bootstrap node then generates one or more control plane nodes configuration from the bootstrap binary. Those control plane nodes may further create compute nodes for executing workloads of the cluster. In some systems, the compute nodes may be executed on separate machines from the control plane nodes. Alternatively, in some systems the compute nodes may execute on the same machine as the control plane nodes. For example, some users may prefer to create and run a container orchestration system on a single node. Conventional systems would still use an additional bootstrap node to install the container orchestration system on the single node. For example, the bootstrap node may host remote resources required for the master nodes to boot and the single node would fetch the remote resources from the bootstrap node to finish booting.

In some circumstances, however, an additional node may not be available for bootstrapping of the node. For example, a single node may be physically isolated yet may benefit from the functionality of the scalability and flexibility of a container orchestration system (e.g., a 5G transmission station or tower to switch communications). Because there are no nodes available to be used as a bootstrap node to keep the bootstrap information separate, conventional systems would be unable to deploy a container orchestration system at the isolated node.

Aspects of the disclosure address the above-noted and other deficiencies by providing deployment of a container platform to a single node using bootstrap configuration within a live environment (e.g., a live operating system). For example, a live ISO image may be stored on an external storage device, such as a compact disk read only memory (CD-ROM), a flash drive, and external hard drive, or any other storage medium. The external storage device may be coupled with a computing node which may then boot the live environment. Upon boot of the computing node into the live environment, processing logic may use the bootstrap configuration (e.g., Ignition config file) to configure the control plane of a container platform within the live environment. For example, the bootstrap configuration may include information to generate at least a master configuration and a machine configuration service based on information of the computing node.

After configuring the control plane, the processing logic may then extract the resulting configurations from the control plane to generate a master bootstrap configuration (e.g., a master Ignition config file). The processing logic may then store the master bootstrap configuration in non-volatile storage of the computing node along with an operating system image (e.g., RHCOS image). The processing logic may then reboot the computing node. The live environment may be an ephemeral environment that executes strictly in volatile memory of the computing node so that it is erased upon reboot of the computing node. Therefore, upon reboot the computing node boots into the stored operating system image. Processing logic may then use the master bootstrap configuration to configure the control plane and complete the installation of the container platform.

FIG. 1 depicts a high-level component diagram of an illustrative example of a computer system architecture 100, in accordance with one or more aspects of the present disclosure. One skilled in the art will appreciate that other computer system architectures are possible, and that the implementation of a computer system utilizing examples of the invention are not necessarily limited to the specific architecture depicted by FIG. 1.

As shown in FIG. 1, computer system architecture 100 includes a host system 110 and external storage device 140.

The host system 110A includes one or more processing devices 160, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing devices 160. It should be noted that although, for simplicity, host system 110 is depicted as including a single processing device 160, storage device 180, and device 190 in FIG. 1, other embodiments of host system 110 may include a plurality of processing devices, storage devices, and devices. External storage device 140 may include one or more magnetic hard disk drives, a Peripheral Component Interconnect [PCI] solid state drive, a Redundant Array of Independent Disks [RAID] system, a network attached storage [NAS] array, a flash drive, a CD-ROM, or any other external storage device. The host system 110 may be a server, a mainframe, a workstation, a personal computer (PC), a mobile phone, a palm-sized computing device, etc. In some embodiments, host system 110 may be implemented by a single computing device, such as a bare metal machine. For clarity, some components of external storage device 140 and host system 110 are not shown.

Host system 110 may additionally include one or more virtual machines (VMs) 130, serverless functions 134, containers 136, container orchestration platform 138 and live operating system (OS) 120. VM 130 is a software implementation of a machine that executes programs as though it were an actual physical machine. Serverless function 134 may be a self-contained function that performs a particular task, service, etc. Serverless functions 134 can be instantiated and scaled as necessary to process dynamic workloads. Container 136 acts as an isolated execution environment for different functions of applications. Containers 136 may scale similar to serverless functions 134. The VM 130 and/or container 136 may be an instance of a serverless application or function for executing one or more applications of a serverless framework (e.g., managed by container orchestration platform 138. In some examples, serverless function 134 can be executed within VM 130 and/or container 136. Live OS 120 manages the hardware resources of the computer system and provides functions such as inter-process communication, scheduling, memory management, and so forth.

Live OS 120 may, optionally, include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to live OS 120, rather than embedded within live OS 120, or may replace live OS 120. Host system 110 may also include a container orchestration platform 138 (e.g., Kubernetes) to manage containers 136. For example, container orchestration platform 138 may manage instantiating, scaling, networking, etc. of containers 136. In some examples, container orchestration platform 138 and container 136 may execute on the live OS 120 while VMs 130 are executed by hypervisor 125.

In some embodiments, the external storage device 140 may store a live OS image 120 that includes a bootstrap component 115. The host system 110 may be booted from the external stored device 140 using the live OS image 120. In some examples, the bootstrap component may be, or may include, a set of instructions to perform prior to booting the live OS image 120 on the host system 110. The live OS image 120 be executed by the one or more processing device 160 and may remain strictly within memory 170, or other volatile memory such that the live OS 120 is erased upon shut down or reboot of the host system 110. The bootstrap component 115 may include logic to render another ignition (e.g., a master ignition) that will be stored to the storage device 180 and used to boot and configure a single node container orchestration platform. The initial ignition in the live OS image 120 may generate configuration data for a control plane of a container orchestration platform (e.g., container orchestration platform 138) including secrets, static pods, a machine configuration file, etc. The bootstrap component 115 may retrieve and store configuration information of the control plane as generated and configured based on the hardware of the host system 110 available for provisioning. As described in more detail below with respect to FIGS. 3-5, once the master ignition file is generated and stored, the bootstrap component 115 may reboot the host system 110 from the image and master ignition stored at the storage device 180 of the host system 110.

The host system 110 and external storage device 140 may be coupled (e.g., may be operatively coupled, communicatively coupled, may communicate data/messages with each other) via a communication bus, a CD-ROM drive, a universal serial bus (USB), or other direct connection. Alternatively, the external storage device 140 may be coupled with the host system 110 via a network. For example, the external storage device 140 may be a remote server storing the live OS image 120 with the bootstrap component 115. Further details regarding the bootstrap component 115 will be discussed at FIGS. 2-5 below.

Figure 2:
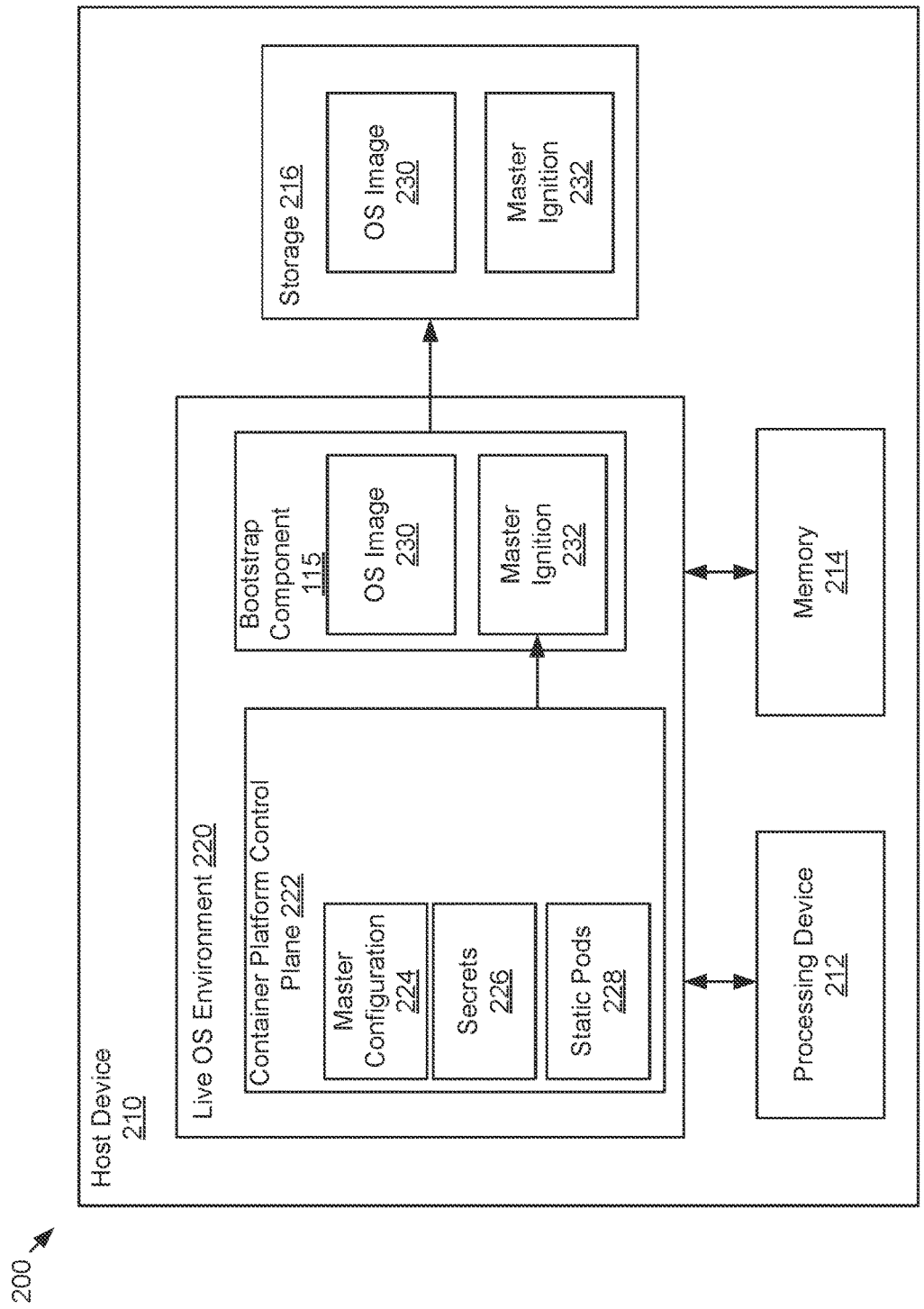
FIG. 2 is a system diagram that illustrates another example of a system bootstrapping of a container orchestration system on a single node, in accordance with embodiments of the disclosure.

FIG. 2 is a block diagram that illustrates a system 200 for deployment of a container orchestration platform on a single computing node, according to embodiments. The host device 210 may include one or more processing devices 212 (e.g., the same or similar to processing devices 160 of FIG. 1), a memory 214 (e.g., the same or similar to memory 170 of FIG. 1), and a one or more non-volatile storage devices 216 (e.g., storage device 180 of FIG. 1). The processing device 212 may execute live OS environment 220 from memory 214. For example, the entire live OS environment 220 may be loaded into memory 214 from an external storage device. The bootstrap component 115 may include an ignition file that configures a container platform control plane 222 upon booting the live OS environment 220 on the host device 210. For example, the ignition included in the bootstrap component 115 may generate master configuration 224 which includes information to configure added nodes (e.g., computing devices or additional control planes) of a cluster, secrets 226 including certificates or other sensitive data for management of a cluster, static pods 228 for running services associated with the container platform control plane 222. The bootstrap component 115 may retrieve configuration data from the master configuration 224, secrets 226, static pods 228, and any other configuration data of the container platform control plane 222. The bootstrap component 115 may then store the OS image 230 and the master ignition file 232 to storage 216 of the host device 210 and reboot the host device 210. Upon reboot, the OS image 230 may be booted and configured from the master ignition 232 to complete installation of the container orchestration platform on the host device 210.

Figure 3:
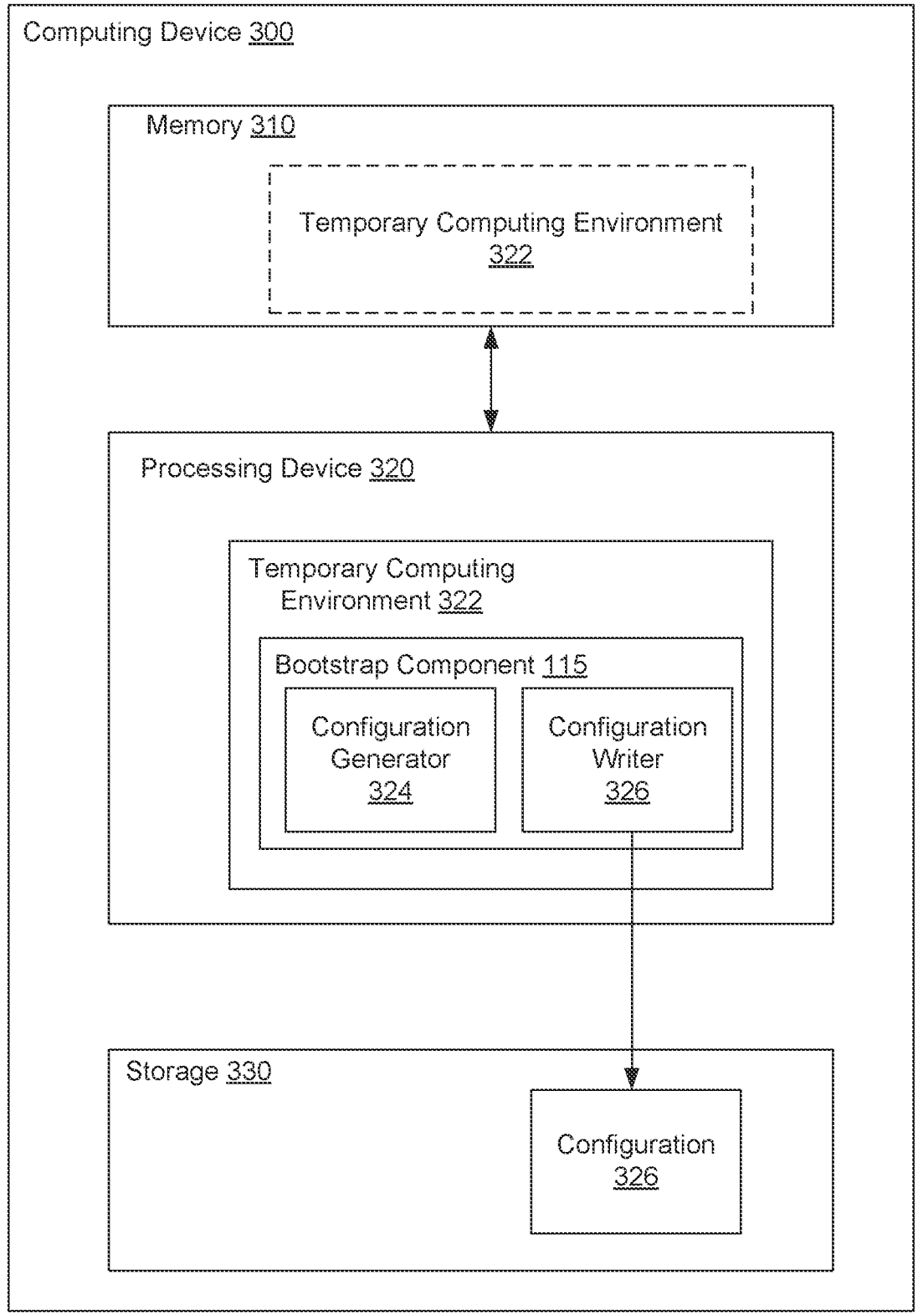
FIG. 3 is a block diagram that illustrates an example of a computer system for deployment of a container orchestration system on a single node, in accordance with embodiments of the disclosure.

FIG. 3 is a block diagram that illustrates a computing system 300 for deploying a container platform on a single node, according to some embodiments. Computing system 300 may include a processing device 320, a memory 310, and storage 330. Memory 310 may include volatile memory devices (e.g., random access memory (RAM)), non-volatile memory devices (e.g., flash memory) and/or other types of memory devices. Processing device 320 may be a central processing unit (CPU) or other processing device of computing system 300. In one example, computer system 300 may be coupled to an external storage device. Storage 330 may include one or more magnetic hard disk drives, a Peripheral Component Interconnect [PCI] solid state drive, a Redundant Array of Independent Disks [RAID] system, a network attached storage [NAS] array, or the like.

In one example, the processing device 320 may execute a temporary computing environment 322 from memory 310. The temporary computing environment 322 may reside completely within memory 310. The temporary computing environment 322 may include a bootstrap component 115 for performing boot-strap in place logic on the computing device 300. The bootstrap component 115 may include a configuration generator 324. The configuration generator 324 may provision resources of the computing device 300 for a container platform control plane to manage the resources of the computing device 300. In some examples, the configuration generator 324 may include an ignition file to configure the control plane within the temporary computing environment 322. The configuration generator 324, for example, may start the control plane and apply configurations to the control plane based on configurations included in the ignition file as well as the resources available on the computing device 300. The bootstrap component 115 may also start a machine configuration server including the master configuration file. The bootstrap component 115 may extract the master configuration file and any other configuration information from the control plane. The configuration writer 326 of the bootstrap component 115 may then write the configuration 326 to storage 330 of the computing device 300. The configuration writer 326 may also write an operating system image to storage 330. For example, the bootstrap component 115 may insert the configuration 326 into an operating system image and store the operating system image with the embedded configuration 326 to storage 330. In some examples, the configuration 326 may be a master ignition file generated from the configurations of the container platform control plane in the temporary computing environment 322. Upon reboot, the temporary computing environment 322 may be deleted and the computing device 300 may boot from the operating system in storage 330 and the processing device 320 may use the configuration 326 to install and perform initial configuration of the container orchestration platform.

Figure 4:
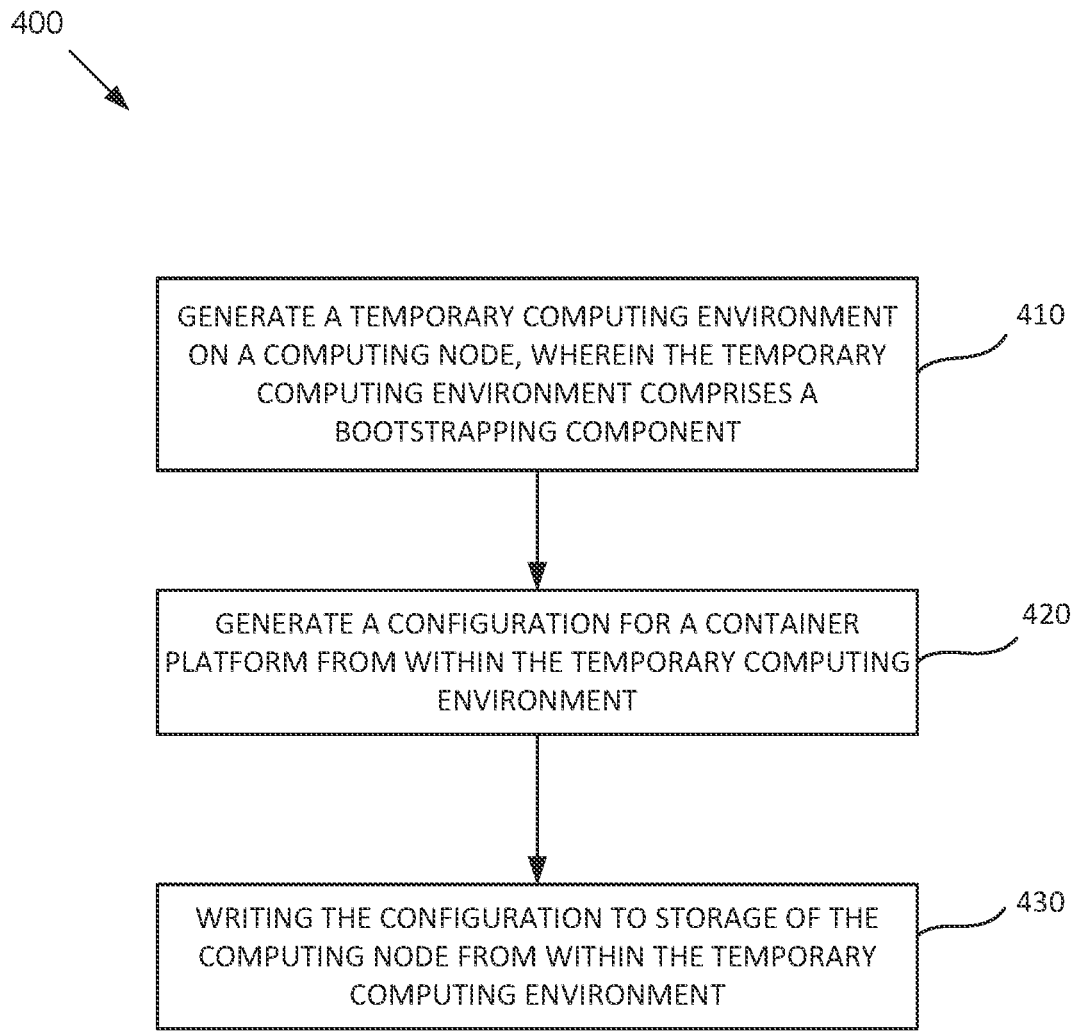
FIG. 4 is a flow diagram of a method of deploying a container orchestration system on a single node, in accordance with some embodiments.

FIG. 4 is a flow diagram of a method 400 of single node deployment of a container platform, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by bootstrap component 115 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic generates a temporary computing environment on a computing node, wherein the temporary computing environment comprises a bootstrapping component. The temporary computing environment may reside and execute within memory of the computing node. In some examples, the temporary computing environment may be booted and configured by the bootstrapping component.

At block 420, the processing logic generates a configuration for a container platform from within the temporary computing environment. In one example, the configuration may be an ignition file and a computing environment image. The computing environment image may be an operating system image (e.g., an RHCOS™ image) and the configuration file may be embedded within the operating system image. In some examples, generating the configuration for the container environment includes generating a container platform within the temporary computing environment using the ignition file and properties of the computing node. The properties may be resources of the computing node that are available to be provisioned by the container platform. In some examples, the ignition file includes and/or instantiates one or more services to generate and operate a container control plane, generate secrets for the container platform, and apply node configurations.

At block 430, the processing logic writes the configuration to storage of the computing node from within the temporary computing environment. For example, the bootstrapping component may write an operating system image, embedded with the configuration, to storage. In some examples, after writing the configuration to storage, the processing logic may further reboot the computing node using the operating system image and the ignition file. The processing logic may use the configuration to install and configure the container platform on the computing node.

Figure 5:
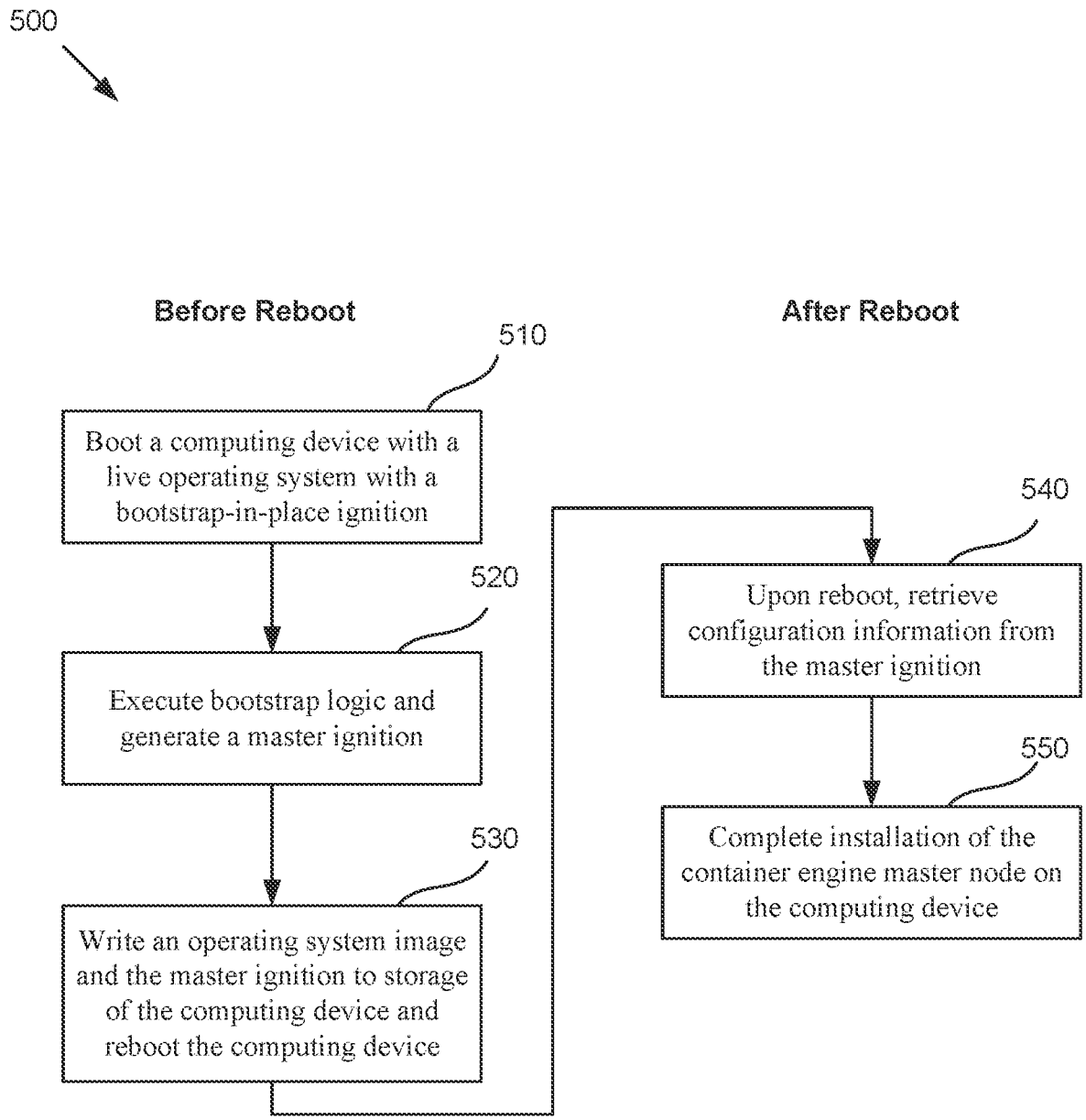
FIG. 5 is a flow diagram of an example method of deploying a container orchestration system on a single node, in accordance with some embodiments.

FIG. 5 is a flow diagram of a method 500 of deploying a container orchestration system on a single node, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by bootstrap component 115 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic boots a computing device with a live operating system embedded with a bootstrap-in-place-ignition. At block 520, the processing logic executes bootstrap logic and generates a master ignition file. The bootstrap logic may include starting and configuring a container control plane from configuration in the bootstrap-in-place ignition. The configurations are applied to the container control plane and a machine configuration server is started. The machine configuration server may include the master configuration of the control plane on the computing device which may further be used to generate additional master nodes if available. The processing logic may extract the master configuration of the control plane and additional configuration info (e.g., static pod definitions and etcd data) of the control plane and add it to a master ignition. In some examples, the configuration information copied to the master ignition includes an etcd pod, a api server pod, a controller-manager pod, and a scheduler pod. Additionally, an etcd snapshot, one or more transport layer security (TLS) certificates, a platform config file, bootstrap logs, etc. may be copied to the master ignition. The master ignition may include the configurations for a single node container platform to be installed on the computing device.

At block 530, the processing logic writes an operating system image with the master ignition to storage of the computing device and reboots the computing device. The reboot of the computing device erases the live operating system and the information generated by the bootstrap logic, except for the operating system and master ignition saved to storage. At block 540, upon reboot of the computing device, the processing logic retrieves configuration information from the master ignition. The master ignition may be stored in a particular area of storage from which a container platform service can retrieve the configuration files of the master ignition. The processing logic may then start one or more static pods running the configurations written to the master ignition files. For example, a service (e.g., kubelet) may be started. The service may monitor one or more directories for static pod manifests. Upon identifying the control plane static pods, the processing logic may begin running containers to satisfy the static pod manifests. These containers may operate as the initial control plane to allow the computing node to complete the bootstrap process.

At block 550, the processing logic completes installation of the container platform master node on the computing device. Upon completion of the installation, the computing device may act as both master and worker node, thus providing for a single node deployment of a container platform on the computing device.

Figure 6:
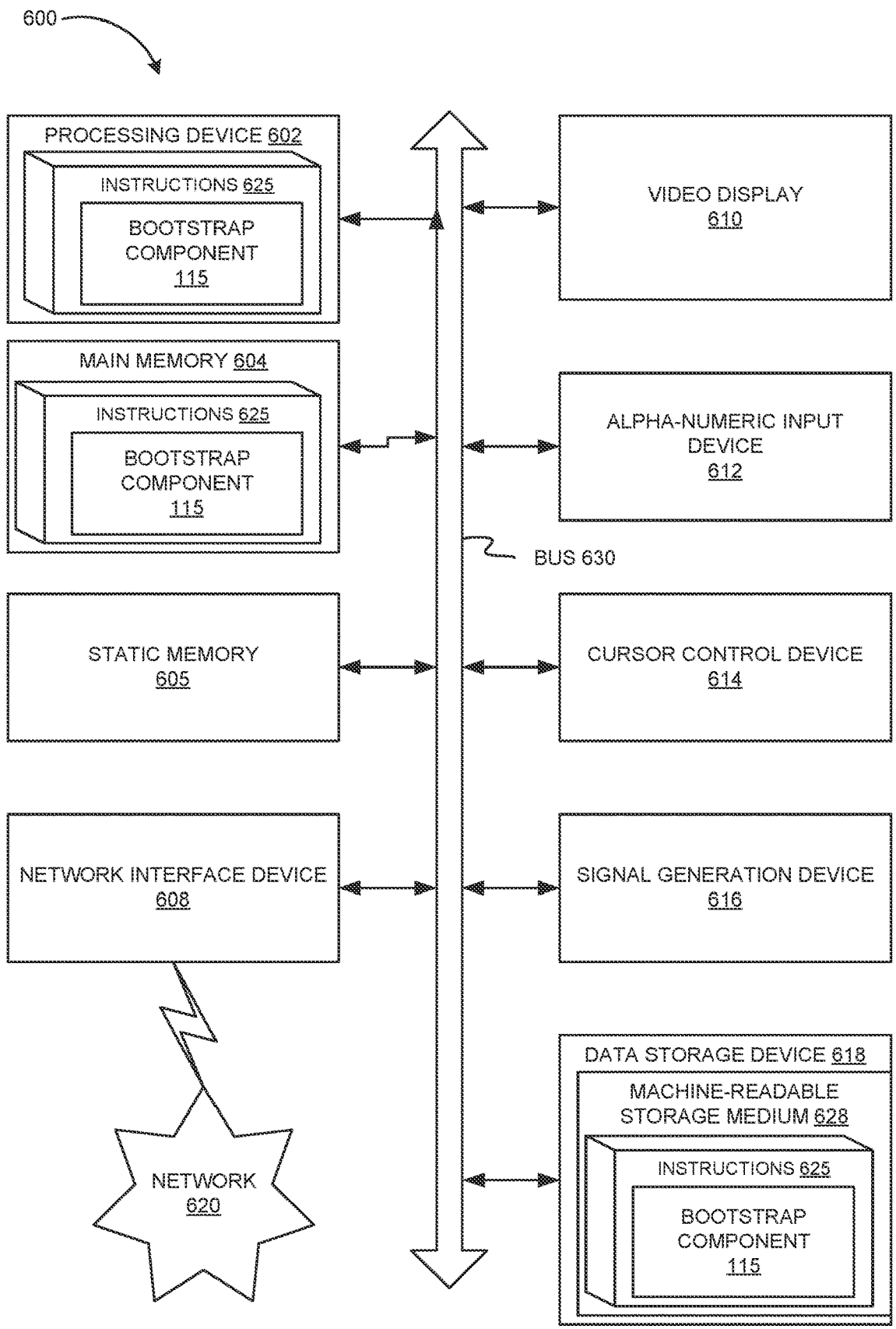
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a bootstrap component, e.g., bootstrap component 115, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
generating a temporary computing environment on a computing node, wherein the temporary computing environment comprises a live operating system executed in memory of the computing node and booted from an external storage device, the live operating system comprising a bootstrapping component for configuring a container platform prior to installation of the container platform at the computing node;
generating, by a processing device executing the bootstrapping component, a configuration for the container platform from within the temporary computing environment;

incorporating the configuration for the container platform into an operating system image that is configured to boot the computing node; and writing, by the processing device, the operating system image including the configuration to storage of the computing node from within the temporary computing environment.

2. The method of claim 1, wherein the temporary computing environment executes exclusively within memory of the computing node.

3. The method of claim 1, wherein the configuration comprises an ignition file and a computing environment image.

4. The method of claim 3, further comprising:
rebooting the computing node with the ignition file and the computing environment image.

5. The method of claim 4, further comprising:
in response to rebooting the computing node, booting the computing environment image from the storage of the computing node; and
configuring a computing environment booted from the computing environment image in view of the ignition file.

6. The method of claim 1, wherein generating the configuration for the container platform comprises:
generating a container environment within the temporary computing environment in view of an ignition file and properties of the computing node; and
extracting configuration information from the container platform.

7. The method of claim 6, wherein the ignition file comprises:
one or more services to generate a container platform control plane, generate secrets for the container platform, and apply node configurations.

8. A system comprising:
a memory; and
a processing device, operatively coupled to the memory, the processing device to:
generate a temporary computing environment on a computing node, wherein the temporary computing environment comprises a live operating system executed in memory of the computing node and booted from a storage device external to the computing node, the live operating system comprising a bootstrapping component for configuring a container platform prior to installation of the container platform at the computing node;
generate, by the bootstrapping component, a configuration for the container platform from within the temporary computing environment;
incorporate the configuration for the container platform into an operating system image that is configured to boot the computing node; and
write the operating system image including the configuration to storage of the computing node from within the temporary computing environment.

9. The system of claim 8, wherein the temporary computing environment executes exclusively within memory of the computing node.

10. The system of claim 8, wherein the configuration comprises an ignition file and a computing environment image.

11. The system of claim 10, wherein the processing device is further to:
reboot the computing node with the ignition file and the computing environment image.

12. The system of claim 11, wherein the processing device is further to:
in response to rebooting the computing node, boot the computing environment image from the storage of the computing node; and
configure a computing environment booted from the computing environment image in view of the ignition file.

13. The system of claim 8, wherein to generate the configuration for the container platform, the processing device is to:
generate a container environment within the temporary computing environment in view of an ignition file and properties of the computing node; and
extract configuration information from the container platform.

14. The system of claim 13, wherein the ignition file comprises:
one or more services to generate a container platform control plane, generate secrets for the container platform, and apply node configurations.

15. A non-transitory computer-readable storage medium including instructions that, when executed by a processing device, cause the processing device to:
generate a temporary computing environment on a computing node, wherein the temporary computing environment comprises a live operating system executed in memory of the computing node and booted from a storage device external to the computing node, the live operating system comprising a bootstrapping component for configuring a container platform prior to installation of the container platform at the computing node;
generate, by the processing device executing the bootstrapping component, a configuration for the container platform from within the temporary computing environment;
incorporate the configuration for the container platform into an operating system image that is configured to boot the computing node; and
write, by the processing device, the operating system image including the configuration to storage of the computing node from within the temporary computing environment.

16. The non-transitory computer-readable storage medium of claim 15, wherein the temporary computing environment executes exclusively within memory of the computing node.

17. The non-transitory computer-readable storage medium of claim 15, wherein the configuration comprises an ignition file and a computing environment image.

18. The non-transitory computer-readable storage medium of claim 17, wherein the processing device is further to:
reboot the computing node with the ignition file and the computing environment image.

19. The non-transitory computer-readable storage medium of claim 18, wherein the processing device is further to:
in response to rebooting the computing node, boot the computing environment image from the storage of the computing node; and
configure a computing environment booted from the computing environment image in view of the ignition file.

20. The non-transitory computer-readable storage medium of claim 15, wherein to generate the configuration for the container platform, the processing device is to:
    generate a container environment within the temporary computing environment in view of an ignition file and properties of the computing node; and
    extract configuration information from the container platform.

\* \* \* \* \*